United States Patent
Yang

(10) Patent No.: US 7,123,594 B2
(45) Date of Patent: Oct. 17, 2006

(54) METHOD FOR SEPARATING AND PROCESSING SIGNAL AND BEARER IN ALL IP RADIO ACCESS NETWORK

(75) Inventor: Shin-Hyun Yang, Seoul (KR)

(73) Assignee: UTStarcom Korea Limited, CA (US)

( * ) Notice: Subject to any disclaimer, the term of this patent is extended or adjusted under 35 U.S.C. 154(b) by 1020 days.

(21) Appl. No.: 09/863,483

(22) Filed: May 23, 2001

(65) Prior Publication Data

US 2002/0039358 A1 Apr. 4, 2002

(30) Foreign Application Priority Data

Aug. 21, 2000 (KR) ................ 2000-48434

(51) Int. Cl.
H04Q 7/00 (2006.01)
H04Q 7/24 (2006.01)
H04L 12/66 (2006.01)
(52) U.S. Cl. .................. 370/328; 370/338; 370/352
(58) Field of Classification Search ........ 370/328–338, 370/352–356
See application file for complete search history.

(56) References Cited

U.S. PATENT DOCUMENTS

| | | | |
|---|---|---|---|
| 5,920,812 A | 7/1999 | Palviainen | 455/417 |
| 5,999,815 A | 12/1999 | TenBrook et al. | 455/436 |
| 6,208,633 B1 | 3/2001 | Jouppila et al. | 370/338 |
| 6,526,026 B1 * | 2/2003 | Menon | 370/310 |
| 6,668,175 B1 * | 12/2003 | Almgren et al. | 455/522 |
| 6,714,515 B1 * | 3/2004 | Marchand | 370/231 |

* cited by examiner

Primary Examiner—Huy D. Vu
Assistant Examiner—Daniel Ryman
(74) Attorney, Agent, or Firm—McDonnell Boehnen Hulbert & Berghoff LLP

(57) ABSTRACT

A method for processing a signal and a bearer separately in an ALL IP network system includes the steps of: transmitting a service request message (SRM) from a mobile station (MS) to a radio network (RN); at the RN, determining whether a circuit related service or a packet related service is requested; if the circuit related service is requested: (i) transmitting a CM service request message to a MSC server, (ii) receiving a service request acknowledgement (SRA) message from the MSC server, and (iii) assigning a bearer in response to the SRA message; and if the packet-related service is requested: (i) transmitting the (SRM) from the RN to a core network without processing the SRM; (ii) at the core network, processing the SRM and transmitting an assignment request to the RN, the assignment request requesting that the RN assign the bearer; and (iii) assigning the bearer in response to the assignment request.

8 Claims, 6 Drawing Sheets

FIG. 1 — Prior Art —

RNCS : RADIO NETWORK CONTROL SYSTEM
RBF : RADIO BEARER FUNCTION
MM : MOBILITY MANAGEMENT

METHOD FOR SEPARATING AND PROCESSING SIGNAL AND BEARER IN ALL IP RADIO ACCESS NETWORK

FIELD OF THE INVENTION

This invention relates to an ALL IP radio access network; and more particularly, to a method for separating and processing a signal and a bearer in an ALL IP radio access network.

DESCRIPTION OF THE ART

These days, it is under detailed discussion at international standardization conferences, such as 3GPP and 3GPP2 conferences, that an entire network of a 3G system is to be configured as an ALL IP network based on IP (IP=Internet Protocol).

The ALL IP network is based on a Mobile IP of an IETF (IETF=International Engineering Task Force). In the Mobile IP case, a two-tier address system is adopted for an address conversion technique at the IP layer. In other words, a first address is a COA (COA=care-of address) that is used for path assignment and for transferring data. A second address is a home address that is a unique home address of a mobile host and is used for identifying the mobile host and for session connection.

A unique Internet address called a home address is assigned to a mobile station for the ALL IP network, wherein the unique Internet address corresponds to a host name, similar to the case of an existing fixed host. Also, the mobile station for the ALL IP network has a COA (care-of address) as a packet transfer point, wherein the COA gets changed as the mobile station for the ALL IP network moves between networks. At the present time, the IETF defines three components for mobile IP service: a mobile node, an HA (HA=home agent) and an FA (FA=foreign agent), as described below.

The mobile node is operated as a host or route that supports a mobile service. The mobile node is able to move between networks without modifying an IP address thereof and also communicate continuously with other nodes of the internet by a fixed IP address thereof.

The HA (home agent) is an agent included in a home network of a mobile node, wherein the home network manages a current COA (care-of address) and a home address of the mobile node. The HA (home agent) performs a tunneling function in order to transfer a datagram addressed to the mobile node to a network to which the mobile node is currently attached when the mobile node is in an external (or foreign) network.

The FA (foreign agent) is an agent assigning the COA (care-of address) when the mobile node is in the external network. The FA can assign an IP address as a COA or a temporary IP address to the mobile node. The FA provides a routing service for any mobile node when the mobile node moves into a service area covered by the FA. After performing a detunneling function on a datagram that was tunneled from an HA of the mobile node, the FA transfers the datagram to the mobile node. The FA also provides a gateway service for datagrams transmitted from the mobile node.

A standard model being used in ALL IP networks defines an IPMM (IPMM=IP multi-media) domain and an ANSI-41 domain (ANSI=American National Standards Institute) for a core network. Here the IPMM domain is used for a packet service and the ANSI-41 domain is used for an existing circuit service. Protocols for the IPMM domain are based on Mobile IP, the Session Initiation Protocol (SIP) or the like. Protocols for the ANSI-41 domain are based on IS-2000, IOS, ANSI-41 or the like.

According to a model being currently used, a single entity performs processing of a signal and a bearer in a radio network as shown in FIG. 1. However, this model can be unsuitable for development into an open type structure.

Currently, a message that a mobile station sends to request a connection is transmitted to an MSC (MSC=mobile switching center) via a BSC (BSC=base station controller) according to IS-2000. A currently-operating BSC includes one entity for controlling a call-related signal and a bearer of user data and for providing a path.

As a currently operating network evolves into an ALL IP network, it is required to control and manage a new service and new user data. To do so, a core network is classified into the ANSI-41 domain for the existing service and the IPMM (IP multi-media) domain. The IPMM domain provides the new service and an internet-based service.

Accordingly, it is required to configure the BSC to include a signal-related entity and a bearer related entity to process the signal and the bearer separately.

SUMMARY OF THE INVENTION

It is an object of the present invention to provide a method for separating and processing a signal and a bearer in an ALL IP radio access network and computer-readable recording media storing instructions for performing the method to perform a flexible configuration of a radio network based on IP.

In accordance with an aspect of the present invention, there is provided a method for processing a signal and a bearer separately in an ALL IP network system including one or more mobile stations, one or more radio networks and one or more core networks, the method including the steps of: transmitting a service request message from a mobile station to a radio network; at the radio network, determining whether a circuit-related service or a packet-related service is requested; if the circuit-related service is requested: (i) transmitting a CM service request message to a mobile switching center (MSC) server, (ii) receiving a service request acknowledgement message from the MSC server, and (iii) assigning a bearer in response to the service request acknowledgement message; and if the packet-related service is requested: (i)transmitting the service request message from the radio network to a core network without processing the service request message; (ii) at the core network, processing the service request message and transmitting an assignment request to the radio network, the assignment request requesting that the radio network assign a bearer for user data; and (iii) assigning the bearer in response to the assignment request.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
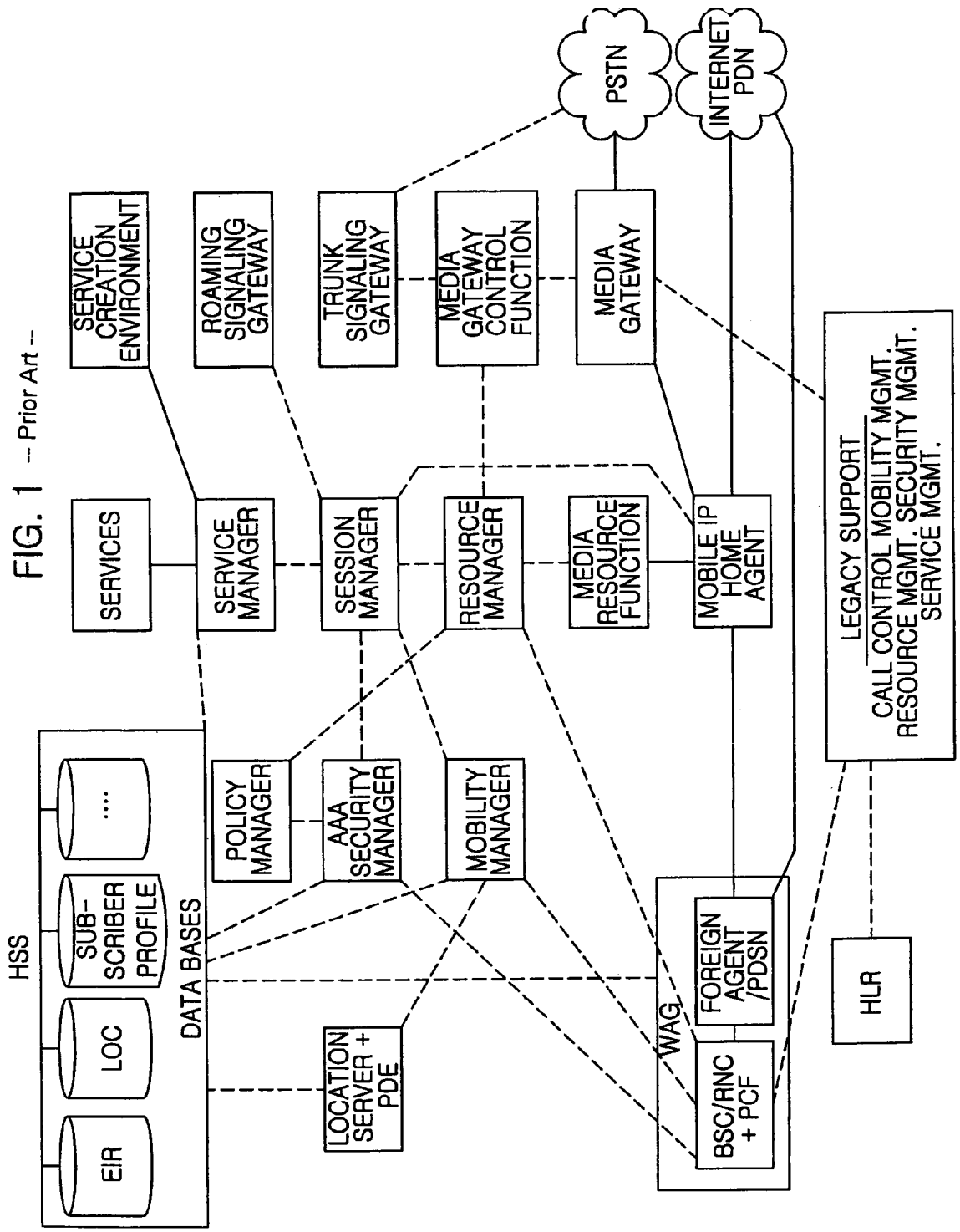
FIG. 1 shows a configuration of an ALL IP network.

FIG. 1 is a simplified block diagram of an exemplary radio network known in the prior art. As shown in FIG. 1, the radio network includes databases, a policy manager, a AAA security manager, a mobility manager, a location server, a service creation environment, a roaming signaling gateway, a trunk signaling gateway, a media gateway control function, a media gateway, a PSTN, a PDN, a service manager, a session manager, a resource manager, a media resource, a media resource function, a HLR, and a mobile IP home agent.

Figure 2:
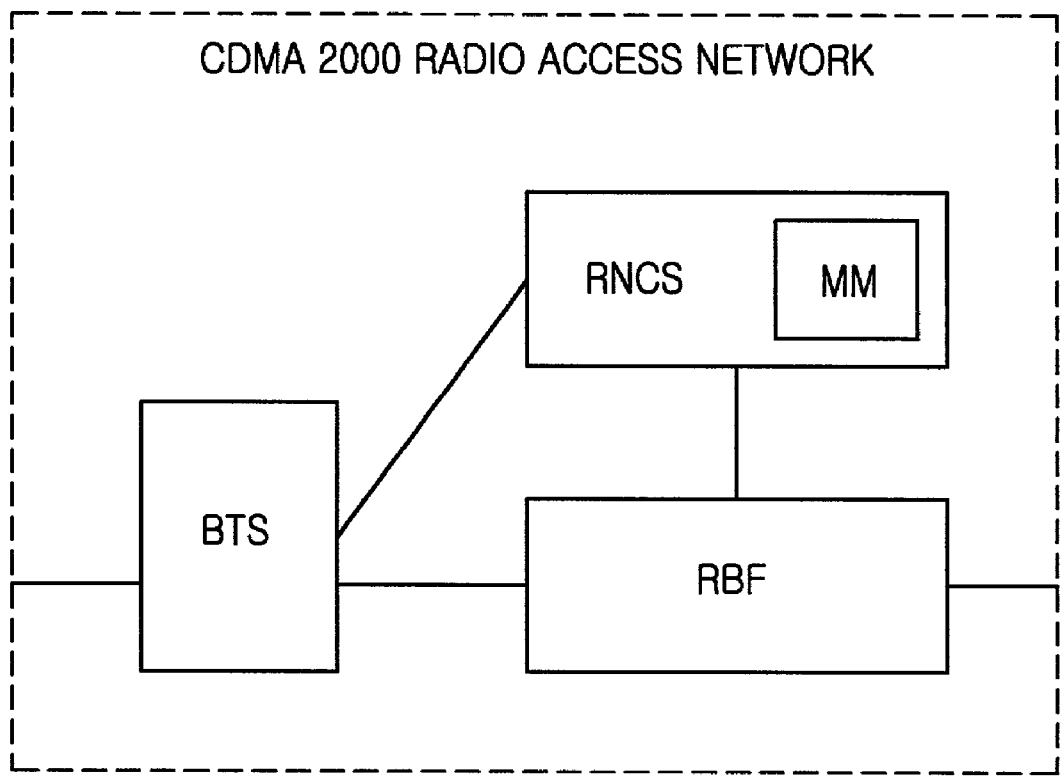
FIG. 2 shows a configuration of a radio network in which a signal and a bearer are separated in accordance with the present invention.

FIG. 2 shows a configuration of a radio network in which a signal and a bearer are separated.

As shown in FIG. 2, a RAN (RAN=radio access network) includes a first entity for processing a signal or the like, a second entity for providing a path related to a user data process and a base transceiver station (BTS) that is directly coupled to a mobile station (MS).

FIG. 2 is a simplified block diagram of an exemplary CDMA2000 Radio Access Network which comprises a radio network control system (RNCS), a radio bearer function (RBF) and a mobility management (MM).

Figure 3:
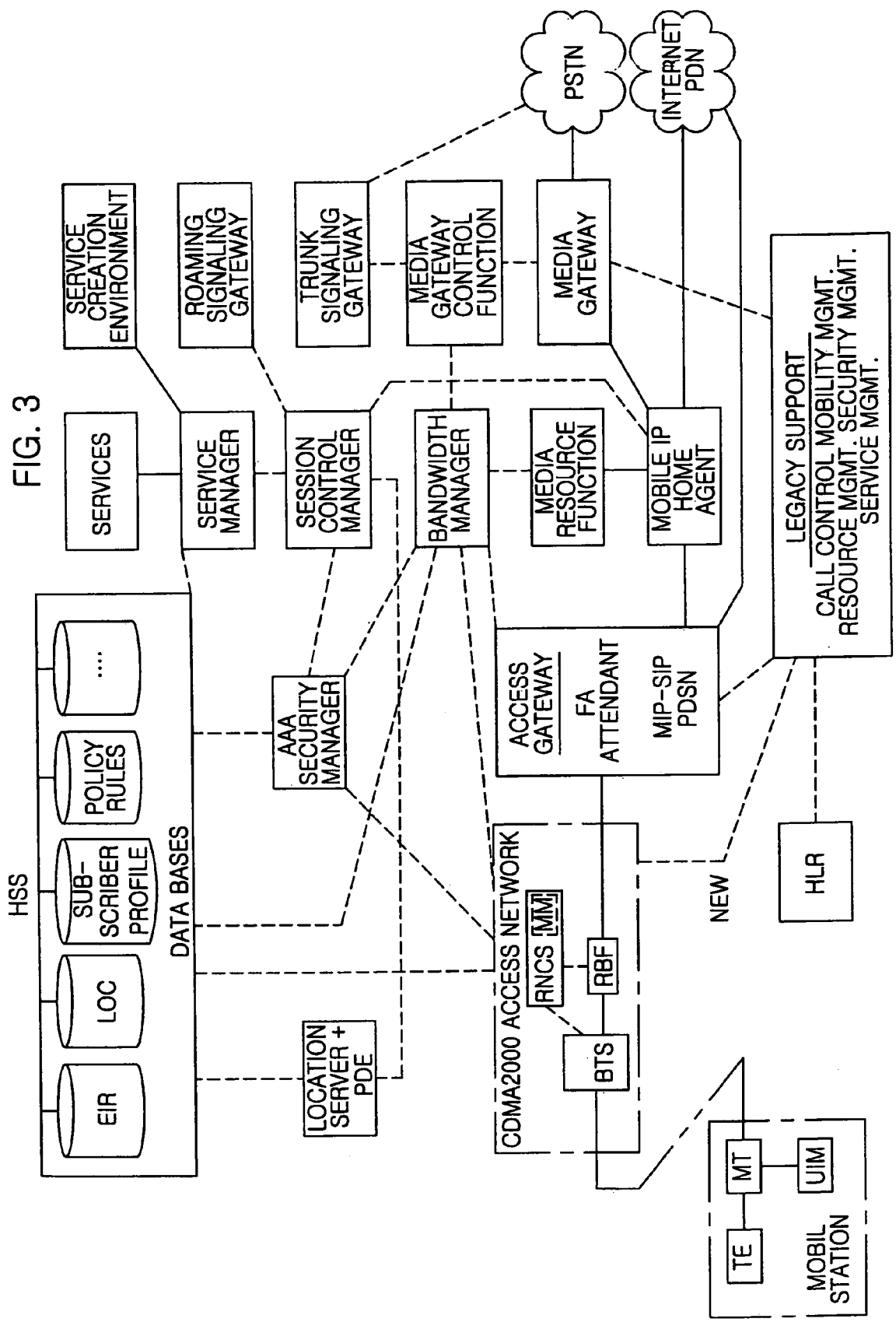
FIG. 3 shows a configuration of an ALL IP network including a radio access network (RAN) shown in FIG. 2.

FIG. 3 is a schematic diagram illustrating an ALL IP network including a radio access network (RAN) shown in FIG. 2.

FIG. 3 includes the CDMA2000 Access network of FIG. 2 in the radio network of FIG. 1.

Figure 4:
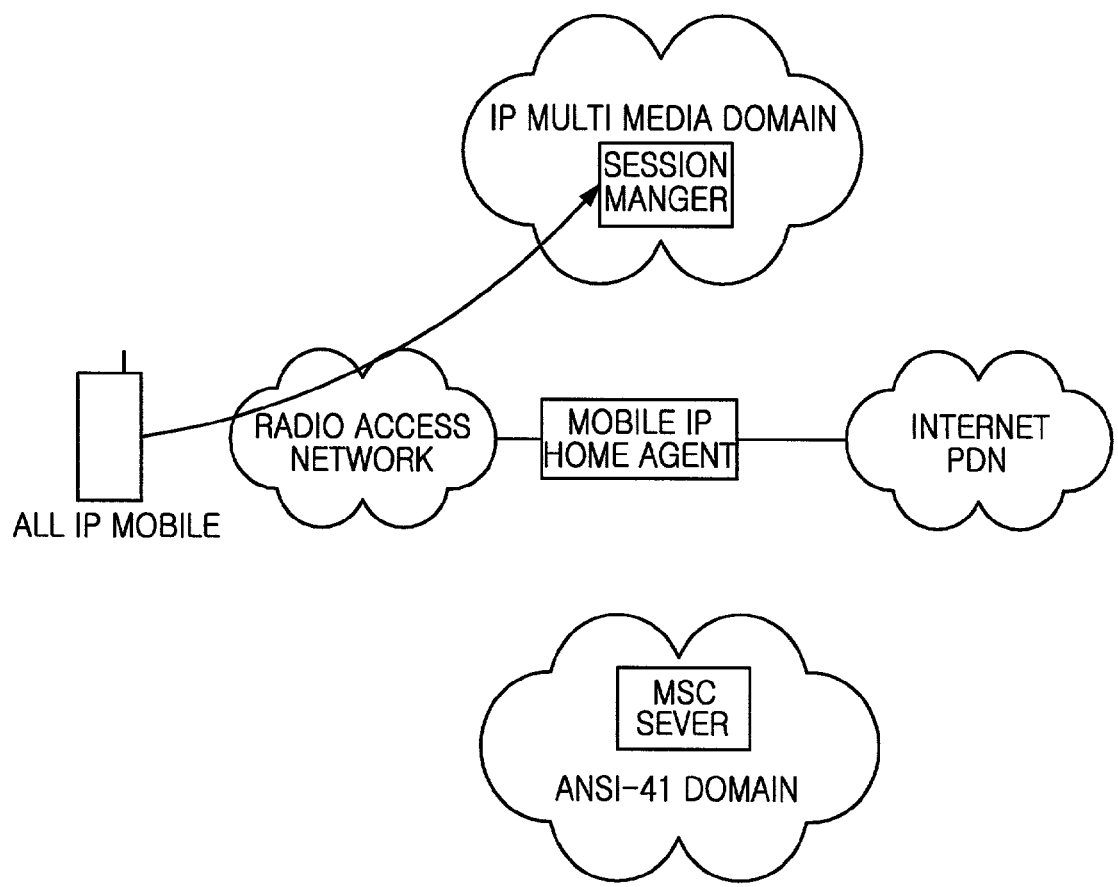
FIG. 4 shows a signaling message flow for a packet service.

FIG. 4 shows a signaling message flow for a packet service.

FIG. 4 comprises an ALL IP mobile, a radio access network, a session manager which is part of an IP multimedia domain, a mobile IP home agent, an internet PDN, and an MSC server which is part of the ANSI-41 domain. As shown in FIG. 4, the ALL IP mobile communicates with the session manager of the IP multi-media domain.

Figure 5:
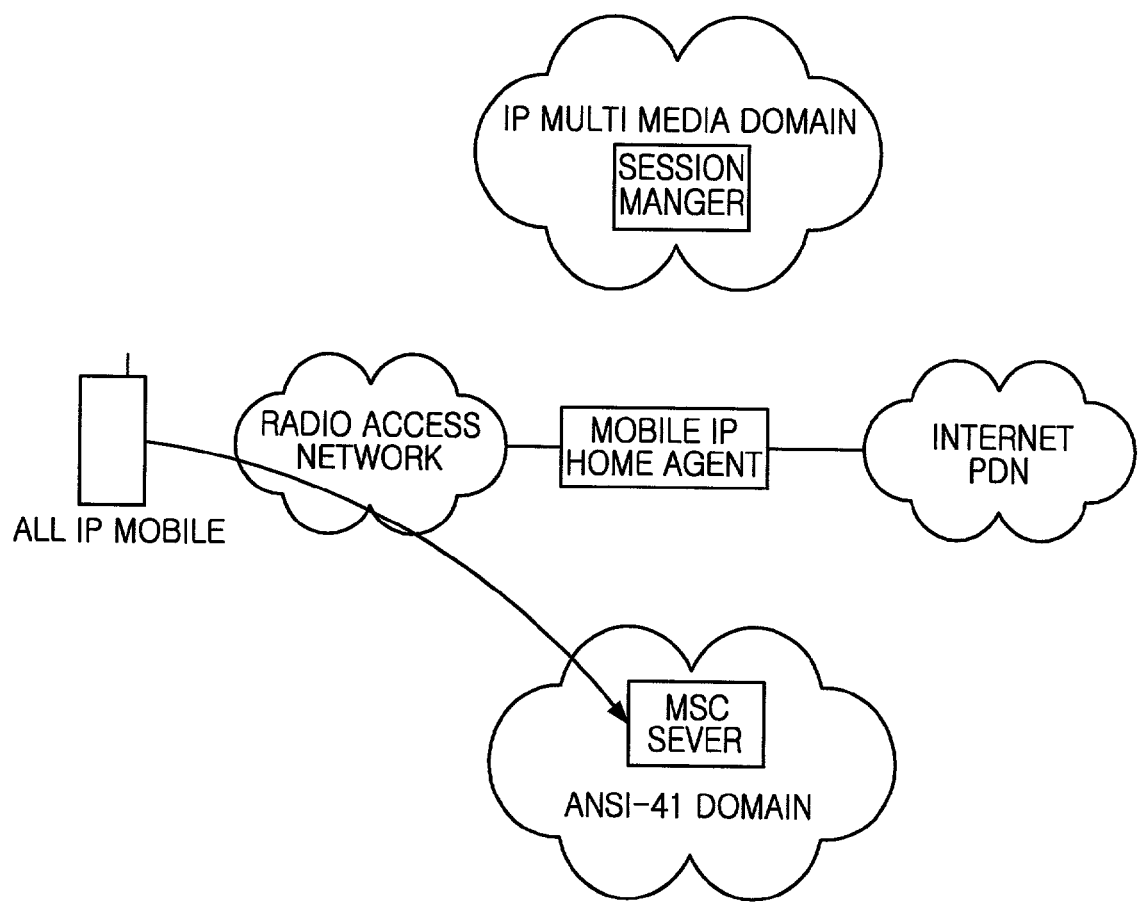
FIG. 5 shows a signaling message flow for a circuit service.

FIG. 5 shows a signaling message flow for a circuit service.

FIG. 5 comprises an ALL IP mobile, a radio access network, a session manager which is part of an IP multimedia domain, a mobile IP home agent, an internet PDN, and an MSC server which is part of the ANSI-41 domain. As shown in FIG. 5, the ALL IP mobile communicates with MSC server.

Referring to FIGS. 4 and 5, the mobile station performs a Signaling suitable for the packet or the circuit services in order to transmit user data. A RNCS (RNCS=radio network control system) of a RAN (radio access network) performs a corresponding function in response to a request of the mobile station. Here, the mobile station is assumed to be a dual mode mobile station where an existing circuit and a packet services are possible to provide.

Figure 6:
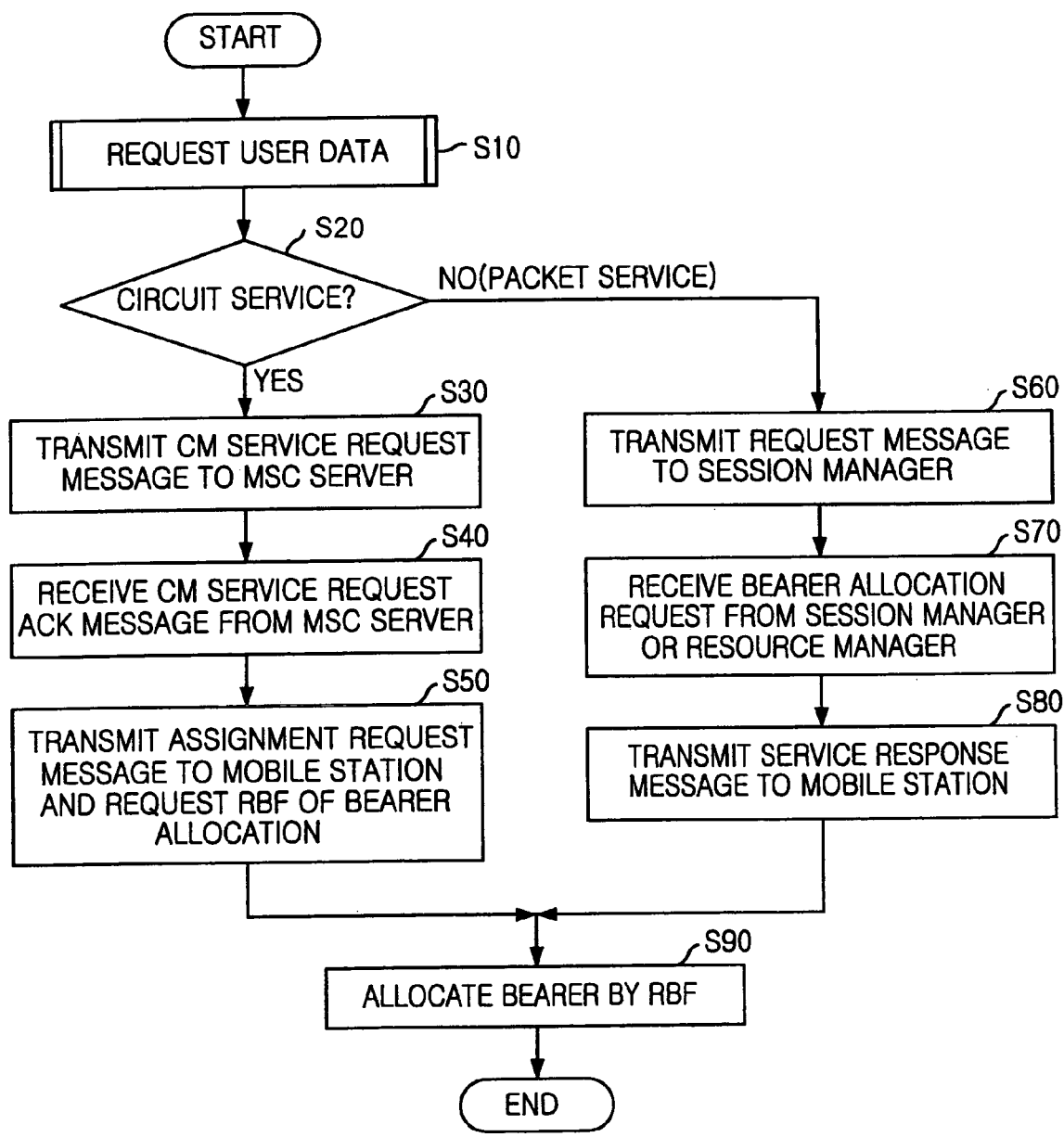
FIG. 6 is a flow chart illustrating a method for separating and processing a signal and a bearer in an ALL IP radio access network in accordance with the present invention.

FIG. 6 is a flow chart illustrating a method for separating and processing a signal and a bearer in an ALL IP radio access network in accordance with the present invention.

At the step S10, a service request of a user is received in a message form from a mobile station.

At the step S20, an RNCS (radio network control system) of a RAN (radio access network) determines whether a first message related to a circuit service or a second message related to a packet service is received.

There are a plurality of methods for service determination. Herein is provided a method for the determination using an address of a TCP/IP header. In other words, since the packet service message is transmitted to a session manager of a core network, the address of the TCP/IP header has an address of the session manager. On the contrary, since the circuit service message is transmitted to an MSC (MSC=mobile switching center) server of the core network, the address of the TCP/IP header has an address of the MSC server.

If the first (circuit service) message is received, at the step S30, the RNCS of the RAN transmits a CM service request message to the MSC server, wherein the CM service request message is generated in an IOS message form.

At the step S40, the MSC receives and processes the CM service request message and then transmits a CM service request Ack message to the RNCS.

At the step S50, after receiving the CM service request Ack message, the RNCS transmits an assignment request message to the mobile station in order to assign a radio channel and then transmits a bearer assignment request message to an RBF unit (RBF=radio bearer function) in order to assign a bearer for transmitting user data.

If the second (packet service) message is received, at the step S60, the RNCS transmits the second message to the session manager of the core network without any message processing.

At the step S70, the session manager or a resource manager of the core network processes the second message and then requests that the RNCS assign the bearer for processing the user data.

At the step S80, the RNCS transmits a response message related to the service request to the mobile station and then transmits the bearer assignment request message to the RBF unit in order to assign the bearer for transmitting the user data.

At the step S90, after receiving the bearer assignment request message from the RNCS, the RBF assigns the bearer.

In accordance with the present invention, there is an effect that a signal and a bearer are separated and processed in a RAN system of an ALL IP network to thereby facilitate network configuration of an open type structure, increase extension capability of each system and perform a flexible configuration of a network based on IP.

Although the preferred embodiments of the invention have been disclosed for illustrative purposes, those skilled in the art will appreciate that various modifications, additions, and substitutions are possible, without departing from the scope and spirit of the invention as disclosed in the accompanying claims.

What is claimed is:

1. A method for processing a signal and a bearer separately in an ALL IP network system including one or more mobile stations, one or more radio networks and one or more core networks, the method comprising the steps of:

a) transmitting a service request message from a mobile station to a radio network;

b) at the radio network, determining whether a circuit related service or a packet-related service is requested;

c) if the circuit related service is requested:
(i) transmitting a connection management (CM) service request message to a mobile switching center (MSC) server;
(ii) receiving a service request acknowledgement message from the MSC server; and
(iii) assigning a bearer in response to the service request acknowledgement message; and
d) if the packet-related service is requested:
(i) transmitting the service request message from the radio network to a core network without processing the service request message;
(ii) at the core network, processing the service request message and transmitting an assignment request to the radio network, the assignment request requesting that the radio network assign a bearer for user data; and
(iii) assigning the bearer in response to the assignment request.

2. The method as recited in claim 1, wherein the radio network includes a radio network control system (RNCS) and a radio bearer function (RBF) unit, the RBF unit performing bearer assignment.

3. The method as recited in claim 2, wherein the core network includes the MSC server and a session manager, the session manager managing a packet-related message.

4. The method as recited in claim 3, wherein whether the circuit-related service or the packet related service is requested is determined by reading an address of a TCP/IP header allocated to each service request message.

5. The method as recited in claim 4, wherein if the address of the TCP/IP header has an address of the session manager, it is determined that the packet-related service is requested.

6. The method as recited in claim 5, wherein the step d)(iii) includes the steps of:
(A) transmitting a response message related to the service request from the RNCS to the mobile station;
(B) at the RNCS, requesting that the RBF unit assign the bearer; and
(C) at the RBF unit, assigning the bearer.

7. Computer-readable recording media storing instructions for performing a method for processing a signal and a bearer separately in an ALL IP network system including one or more mobile stations, one or more radio networks and one or more core networks, the method comprising the steps of:
a) transmitting a service request message from a mobile station to a radio network;
b) at the radio network, determining whether a circuit-related service or a packet-related service is requested;
c) if the circuit related service is requested:
(i) transmitting a connection management (CM) service request message to a mobile switching center (MSC) server;
(ii) receiving a service request acknowledgement message from the MSC server; and
(iii) assigning a bearer in response to the service request acknowledgement message; and
d) if the packet-related service is requested:
(i) transmitting the service request message from the radio network to a core network without processing the service request message;
(ii) at the core network, processing the service request message and transmitting an assignment request to the radio network, the assignment request requesting that the radio network assign a bearer for user data; and
(iii) assigning the bearer in response to the assignment request.

8. The computer-readable recording media as recited in claim 7, wherein the step d)(iii) includes the steps of:
(A) transmitting a response message related to the service request from a radio network control system (RNCS) to the mobile station;
(B) at the RNCS, requesting that a radio bearer function (RBF) unit assign the bearer; and
(C) at the RBF unit, assigning the bearer.

* * * * *